: 
United States Patent
An et al.

(10) Patent No.: US 8,115,354 B2
(45) Date of Patent: Feb. 14, 2012

(54) BRUSHLESS VIBRATION MOTOR

(75) Inventors: Sang Gil An, Gyunggi-do (KR); Sang Won Kim, Gyunggi-do (KR); Yong Tae Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/562,747

(22) Filed: Sep. 18, 2009

(65) Prior Publication Data

US 2010/0289357 A1    Nov. 18, 2010

(30) Foreign Application Priority Data

May 12, 2009    (KR) .................. 10-2009-0041237

(51) Int. Cl.
*H02K 7/06* (2006.01)
(52) U.S. Cl. .......................................... 310/81; 310/91
(58) Field of Classification Search ............... 310/81, 310/67 R, 91
See application file for complete search history.

(56) References Cited

U.S. PATENT DOCUMENTS

| | | | |
|---|---|---|---|
| 2003/0015929 A1* | 1/2003 | Lee | 310/81 |
| 2004/0135444 A1* | 7/2004 | Choi et al. | 310/81 |
| 2006/0022537 A1* | 2/2006 | Yamaguchi et al. | 310/81 |
| 2007/0273224 A1* | 11/2007 | An | 310/81 |

FOREIGN PATENT DOCUMENTS

| | | |
|---|---|---|
| JP | 2006-068593 | 3/2006 |
| KR | 1020040060154 | 7/2004 |
| KR | 1020040110835 | 12/2004 |
| KR | 1020090014522 | 2/2009 |

OTHER PUBLICATIONS

Office Action from counterpart Korean Patent Application No. 10-2009-0041237, Nov. 18, 2010, 10 pages.

* cited by examiner

*Primary Examiner* — Quyen Leung
*Assistant Examiner* — Leda Pham
(74) *Attorney, Agent, or Firm* — Blakely Sokoloff Taylor & Zafman LLP

(57) ABSTRACT

The present invention provides a brushless vibration motor. A bracket has a burring part protruding upwards. A shaft is fitted at a first end thereof into the burring part. A stator comprises at least one coil which is provided on the upper surface of the bracket. The bearing is rotatably fitted over the circumferential outer surface of the shaft. The rotor has a rotor yoke fitted over the circumferential outer surface of the bearing, a magnet coupled to the rotor yoke, and a weight causing eccentric rotation. The stopper is provided on a second end of the shaft and is spaced apart from the upper end of the bearing to by a predetermined distance. The brushless vibration motor of the present invention has no a separate casing, thus enhancing spatial utilization.

10 Claims, 4 Drawing Sheets

BRUSHLESS VIBRATION MOTOR

CROSS REFERENCE TO RELATED APPLICATION

This application claims the benefit of Korean Patent Application No. 10-2009-0041237, filed May 12, 2009, entitled "Brushless vibration motor", which is hereby incorporated by reference in its entirety into this application.

BACKGROUND OF THE INVENTION

1. Technical Field

The present invention relates to a brushless vibration motor.

2. Description of the Related Art

Generally, portable electronic devices, such as mobile phones, game players, mobile information terminals, etc., have various vibration generating units to prevent noise therefrom from disturbing other people. Particularly, such a vibration generating unit is installed in a cellular phone and used as a mute signal reception indicating unit. Recently, in accordance with the trend to provide a small and slim cellular phone, a reduction in the size and an increase in the function of a vibration generating unit installed in the cellular phone are also required.

At present, a vibration generating unit which is one of several signal reception indicating units used in a communication device, such as a cellular phone, converts electric energy into mechanical vibration by the use of a principle of generating electromagnetic force. That is, the vibration generating unit is used as a mute signal reception indicating unit in the cellular phone.

Meanwhile, a method in which mechanical vibration is generated by rotating a rotor having an eccentric weight has been used as a representative example of methods of operating vibration generating units according to conventional techniques. The rotation of the rotor is implemented by a commutator or brush motor structure which commutates currents through a contact point between the brush and the commutator and then supplies the currents to a coil of the rotor.

FIG. 1 is a sectional view showing a brush type vibration motor 10 according to a conventional technique.

As shown in FIG. 1, the brush type vibration motor 10 according to the to conventional technique includes a casing 11, a shaft 13, a magnet 17 and a rotor 19. The casing 11 has a lower plate to which a circuit board 15 is mounted, and an upper plate which covers the upper surface of the lower plate and defines an internal space therein. The shaft 13 is supported by the casing 11. The magnet 17 which is a stator is provided on the perimeter of the upper surface of the lower plate of the casing 11. The rotor 19 is fitted over the shaft 13 so as to be eccentrically rotatable.

The rotor 19 includes a rotary magnetic plate 19a which has an eccentric structure, and a coil 19b and a weight 19c which are installed on the upper surface of the rotary magnetic plate 19a. The rotor 19 further includes a commutator 19d which is provided under the lower surface of the rotary magnetic plate 19a, and a molding body 19e which integrates the rotary magnetic plate 19a, the coil 19b and the weight 19c with each other.

Furthermore, a first end of a brush 23 is soldered to the circuit board 15, and a second end thereof is connected to the commutator 19d to supply external power to the coil 19b.

In the brush type vibration motor 10 having the above-mentioned construction, vibration is generated when external power is supplied to the coil 19b via the circuit board 15, the brush 23 and the commutator 19d, so that the rotor 19 rotates because of electromagnetic force generated between the coil 19b and the magnet 17.

However, in the conventional brush type vibration motor 10, when the brush 23 passes through a gap between segments of the commutator 19d, mechanical friction, electric sparks or abrasion is induced, thus creating impurities, such as black powder, thereby reducing the lifetime of the vibration motor 10. In an effort to overcome these problems, a brushless vibrator was proposed.

FIGS. 2 and 3 respectively are a sectional view and an exploded perspective view showing a brushless vibration motor 50 according to a conventional technique.

As shown in FIGS. 2 and 3, the brushless vibration motor 50 according to the conventional technique includes a bracket 60, a casing 68, a shaft 70, a bearing 80 and a rotor 90. The bracket 60 supports a circuit board 62 thereon, and a coil 64 and a drive IC 66 are mounted to the upper surface of the circuit board 62. The casing 68 is provided on the bracket 60 to define an internal space therein. The shaft 70 is supported at a first end thereof by the bracket 60. The bearing 80 is rotatably fitted over the circumferential outer surface of the shaft 70. The rotor 90 includes a yoke 92, a magnet 94 and a weight 96.

Here, the casing 68 which is fastened to the bracket 60 also functions to prevent the rotor 90 from being lifted up and removed from the shaft 70.

In the brushless vibration motor 50 having the above-mentioned construction, when power is supplied to the coil 64, the rotor 90 rotates eccentrically because of interaction between a magnetic field which is generated by the magnetic circuit including the annular magnet 94 and the yoke 29, and an electric field generated by the coil 64, thus generating vibration.

However, because the conventional brushless vibration motor 50 has the casing 68 which defines the internal space, it is difficult to make the vibration motor 50 thin due to existence of the casing 68. Furthermore, the internal space defined by the casing 68 limits the weight and eccentric distance of the weight 96 and the volume of the magnet 94. Particularly, since the casing 68 functions to prevent the rotor 90 from being lifted up and removed from the vibration motor 50, the use thereof has been indispensable despite the spatial limitation.

Moreover, the limitations in terms of volume of the magnet 94 induce a problem of thermal demagnetization of the magnet 94 attributable to high temperature. To prevent the thermal demagnetization of the magnet 94, an Sm—Co based magnet which is relatively expensive must be used, but this increases the production cost and reduces the reliability because of the characteristics of low strength.

SUMMARY OF THE INVENTION

The present invention has been made in an effort to provide a brushless vibration motor which requires a separate casing, thus increasing spatial utilization, thereby enhancing vibration characteristics.

The present invention provides a brushless vibration motor which includes a stopper for preventing a rotor from being lifted up and is able to prevent abrasion of the stopper.

In a brushless vibration motor according to an embodiment of the present invention, a bracket has a burring part protruding upwards. A shaft is fitted at a first end thereof into the burring part. A stator comprises at least one coil provided on the upper surface of the bracket. A bearing is rotatably fitted over the circumferential outer surface of the shaft. The rotor has a rotor yoke fitted over the circumferential outer surface of the bearing, a magnet coupled to the rotor yoke, and a weight causing eccentric rotation. The stopper is provided on a second end of the shaft and is spaced apart from the upper end of the bearing by a predetermined distance.

Furthermore, a washer may be provided on the upper end of the burring part of the bracket and fitted over the circumferential outer surface of the shaft to support the lower end of the bearing.

As well, a detent torque generating means may be provided in the coil.

The rotor yoke may include a rim part which is fitted over the circumferential outer surface of the bearing, and a horizontal disk part which is bent from the upper end of the rim part and extends outwards.

The magnet and the weight may be coupled to the lower surface of the horizontal disk part of the rotor yoke.

The stopper may have a disk shape having an outer diameter less than that of the to bearing.

The stopper may be coupled to a second end of the shaft by welding.

The stopper may be screwed over the second end of the shaft.

The stopper may be coupled to the second end of the shaft by caulking.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
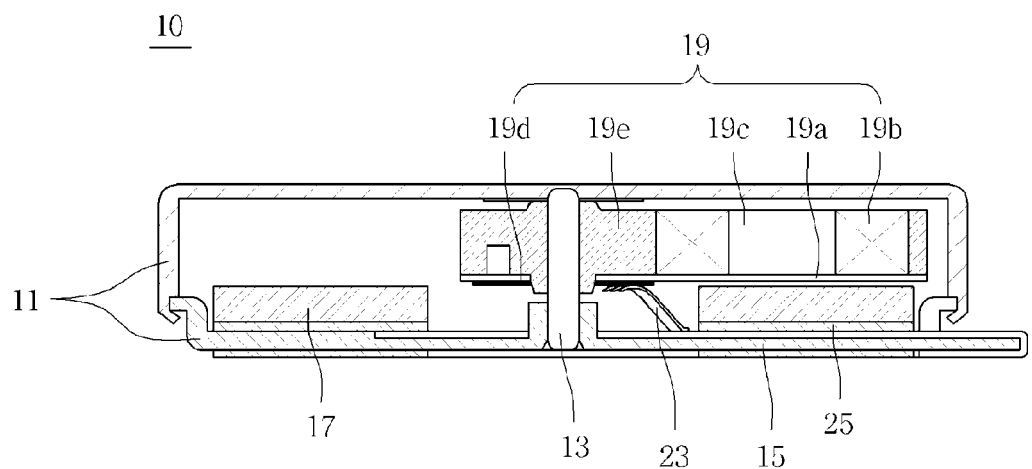
FIG. 1 is a sectional view showing a brush type vibration motor according to a conventional technique.
Figure 2:
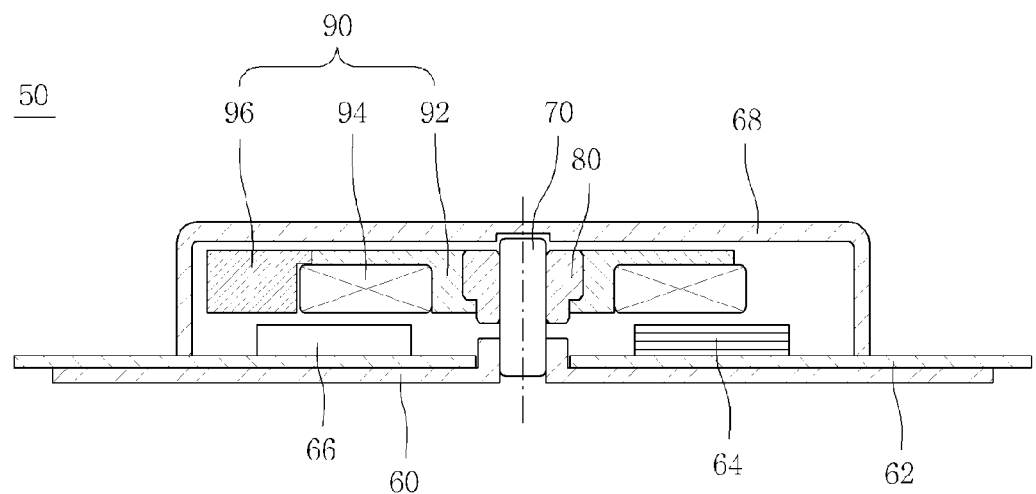
FIG. 2 is a sectional view showing a brushless vibration motor according to a conventional technique.
Figure 3:
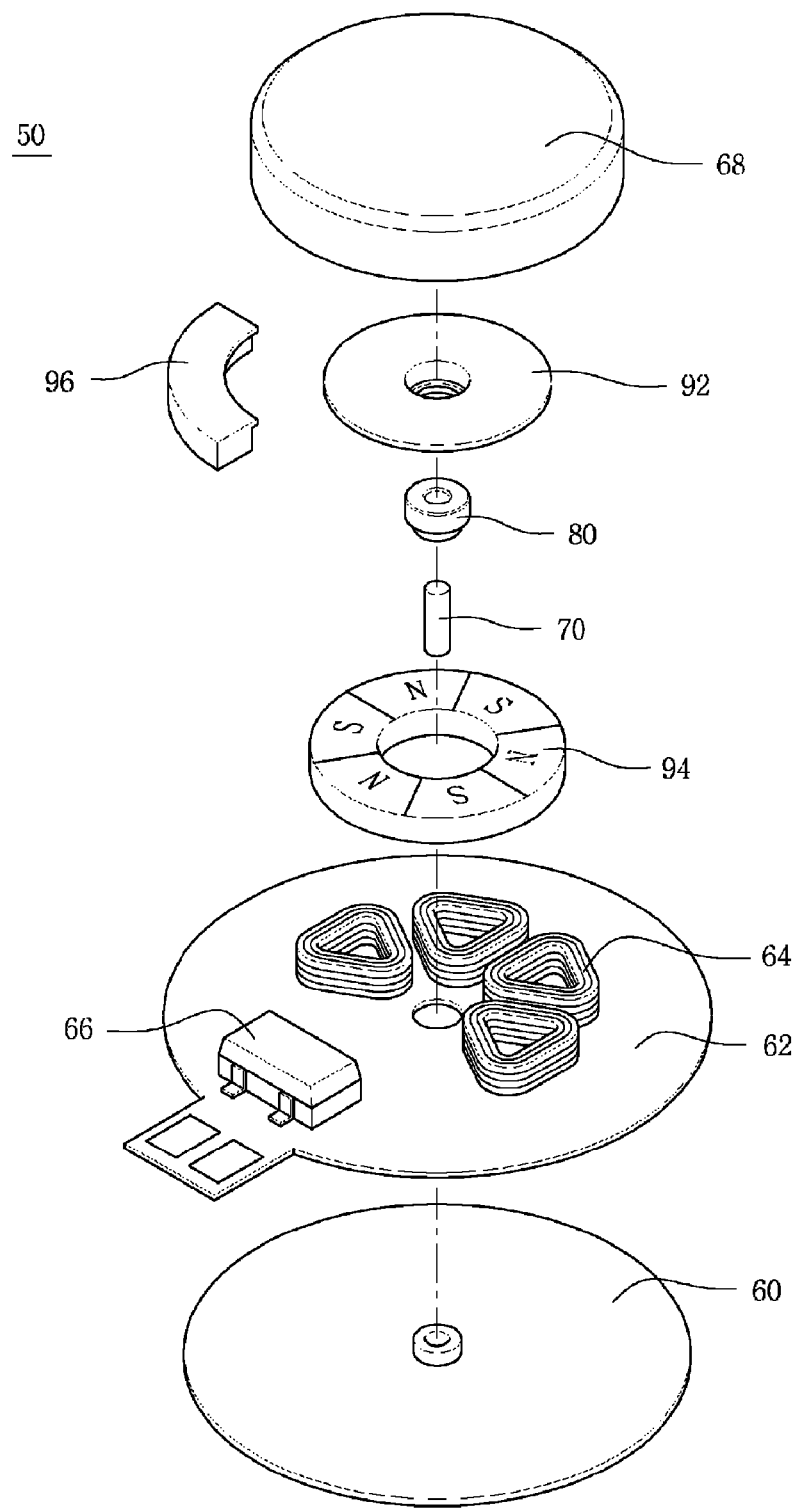
FIG. 3 is an exploded perspective view of the brushless vibration motor of FIG. 2.

Reference now should be made to the drawings, in which the same reference numerals are used throughout the different drawings to designate the same or similar components. In the following description, when it is determined that the detailed description of the conventional function and conventional structure confuses the gist of the present invention, the description may be omitted. Furthermore, the terms and words used to in the specification and claims are not necessarily limited to typical or dictionary meanings, but must be understood to indicate concepts selected by the inventor as the best method of illustrating the present invention, and must be interpreted as having meanings and concepts adapted to the scope and sprit of the present invention for understanding the technology of the present invention.

Figure 4:
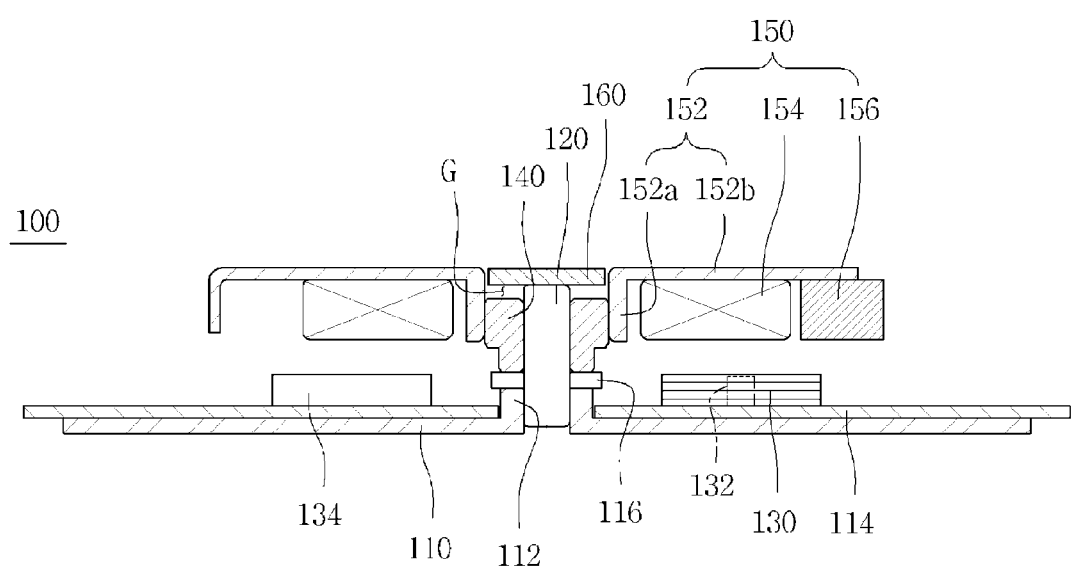
FIG. 4 is a sectional view of a brushless vibration motor according to an embodiment of the present invention.
Figure 5:
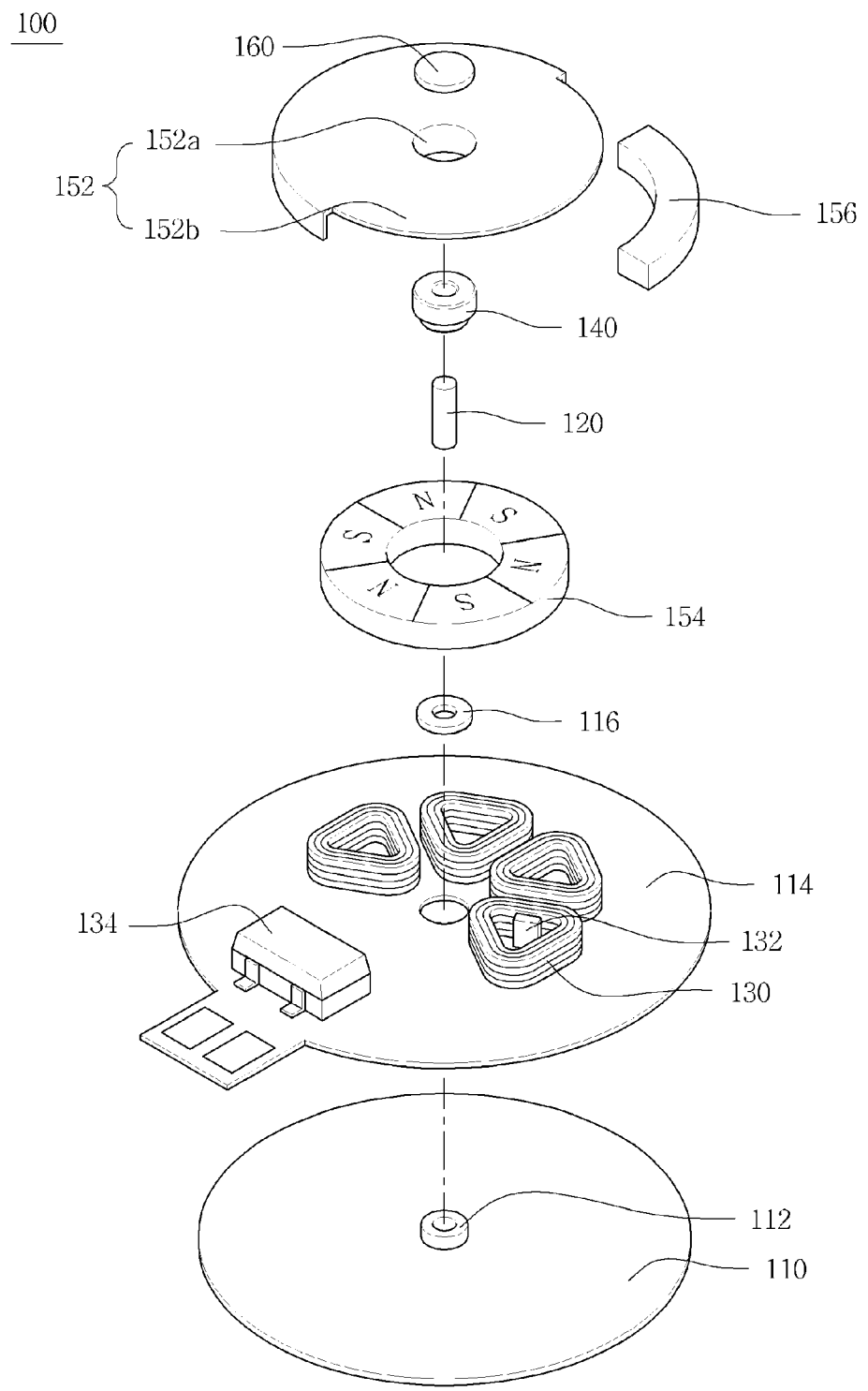
FIG. 5 is an exploded perspective view of the brushless vibration motor of FIG. 4.

Hereinafter, an embodiment of the present invention will be described in detail with reference to the attached drawings. FIG. 4 is a sectional view of a brushless vibration motor 100 according to an embodiment of the present invention. FIG. 5 is an exploded perspective view of the brushless vibration motor 100 of FIG. 4. The brushless vibration motor 100 according to the embodiment of the present invention will be described in detail with reference to FIGS. 4 and 5.

As shown in FIGS. 4 and 5, the brushless vibration motor 100 according to the embodiment of the present invention includes a bracket 110, a stator 130, a bearing 140, a rotor 150 and a stopper 160.

The bracket 110 supports components of the vibration motor including a shaft 120 and a circuit board 114. The bracket 110 has a disk shape having a predetermined thickness. A burring part 112 having a predetermined inner diameter protrudes upwards from the central portion of the bracket 110.

A first end of the shaft 120 having an outer diameter corresponding to the inner diameter of the burring part 112 is force-fitted into the burring part 112 to fasten the shaft 120 to the burring part 112 in a vertical direction. A washer 116 is provided on the upper end of the burring part 112 to prevent the shaft 120 from being worn by contact with the burring part 112. The washer 116 is force-fitted over the circumferential outer surface of the shaft 120 and supports the lower surface of the bearing 140.

The circuit board 114 has terminals connected to an external power supply and is placed on the upper surface of the bracket 110. A stator 130 and a drive IC 134 for controlling currents supplied to the stator 130 are installed on the circuit board 114.

When external power is applied to the stator 130 through the terminals of the circuit board 114, the stator 130 generates a magnetic field of a predetermined intensity, thus generating electromagnetic force by interaction with a magnet 154. The stator 130 comprises at least one coil.

Here, the stator 130 may be placed on the upper surface of the bracket 110 through the circuit board 114 to reduce the thickness of the vibration motor. In this case, the lower end of the stator 130 may be attached to the bracket 110 using a bonding agent.

When the rotor 150 rotates, the positions of the poles of the magnet 154 with respect to the stator 130 are varied. The coil of the stator 130 must be excited in response to the positions of the poles of the magnet 154 to maintain electromagnetic force interacting between the magnet 154 and the stator 130 in the direction of rotation, thus continuously rotating the rotor 150 in one direction. Here, if the magnetic center of the stator 130 is aligned with the magnetic center of the magnet 154, the torque at the magnetic center is reduced, so that the rotor 150 may be stopped or the initial starting operation may not be conducted. Therefore, to prevent this problem, a detent torque (cogging torque) generating means 132 is preferably provided at a predetermined position around the stator 130.

The detent torque generating means 132 is made of a magnetic body, and, for example, it may be disposed inside the coil. The detent torque generating means 132 may be integrally formed with the bracket 110 when forming the bracket 110. Alternatively, the detent torque generating means 132 may be manufactured through a separate process and be attached to a desired portion.

The bearing 140 is rotatably fitted over the circumferential outer surface of the shaft 120 to rotatably support the shaft 120. A lubricant may be applied between the shaft to 120 and the bearing 140. The lower surface of the bearing 140 may be supported by the washer 116 to prevent it from coming into contact with the burring part 112.

The rotor 150 eccentrically rotates to generate vibration and includes a rotor yoke 152, the magnet 154 and a weight 156.

The rotor yoke 152 supports the magnet 154 and the weight 156 and functions as a magnetic flux path. The rotor yoke 152 is fitted over and fixed to the circumferential outer surface of the bearing 140 by welding or the like.

The rotor yoke 152 includes a rim part 152a which is fitted over and fixed to the circumferential outer surface of the bearing 140, and a horizontal disk part 152b which extends outwards from the upper end of the rim part 152a. Here, it is preferable that the rotor yoke 152 be made of a soft magnetic body to smoothen the flow of magnetic flux.

In the present invention, the brushless vibration motor has no separate casing, but the rotor yoke 152 serves as a casing. Therefore, the cost of materials can be reduced, and spatial limitations attributable to the casing are reduced, thus increasing space utilization. Furthermore, the present invention can accommodate the recent trend towards thinness of the brushless vibration motor 100.

The magnet 154 generates a magnetic field of a predetermined intensity such that the rotor 150 can be rotated by interaction with the stator 130. The magnet 154 is attached to the lower surface of the rotor yoke 152 using a bonding agent. Here, the magnet 154 is a multipolar magnetized magnet having an annular shape and faces the stator 130.

As mentioned above, because the present invention has no a separate casing, the size of the magnet 154 can be larger than that of the conventional technique. Hence, the efficiency of the magnetic circuit for causing the rotation of the rotor 150 is enhanced, thus improving the vibration characteristics of the vibration motor.

The weight 156 provides a predetermined weight to enable the rotor 150 to eccentrically rotate. The weight 156 is coupled to a portion of the perimeter of the rotor yoke 152 and is made of non-magnetic material, for example, tungsten (W), to prevent it from being affected by the magnetic force of the magnet 154.

In addition, the weight 156 has a circumference equal to or shorter than that of a semicircle and is attached to the lower surface of the perimeter of the rotor yoke 152.

The vibration quantity of the brushless vibration motor depends on the weight and the eccentric distance of the weight 156. In the present invention, because sufficient weight and eccentric distance of the weight 156 are ensured by there being no casing, the vibration characteristics of the vibration motor can be improved.

The stopper 160 functions to prevent the rotor 150 from being lifted up when it rotates. The stopper 160 is coupled to a second end of the shaft 120 and is spaced apart from the upper surface of the bearing 140 by a predetermined gap G to prevent contact from being made with the bearing 140. As such, because the stopper 160 is prevented from making contact with the bearing 140, the present invention can be free from the problems of deterioration of vibration force or durability of the vibrator motor 100 attributable to contact between the stopper 160 and the bearing 140.

Here, the stopper 160 has a disk shape having an outer diameter less than that of the bearing 140 to prevent it from being brought into contact with the rotor yoke 152 fitted over the circumference of the bearing 140. It is preferable that the stopper 160 be made of metal.

Furthermore, the stopper 160 must be firmly fastened to the second end of the shaft 120 to prevent the rotor 150 from being lifted up and removed from the shaft 120. For this, the stopper 160 may be coupled to the shaft 120 by welding, screw-coupling or caulking.

As described above, a brushless vibration motor according to the present invention does not require a separate casing, because a rotor yoke functions as a casing. Therefore, a problem of spatial limitation attributable to the casing can be solved, thus reducing the cost to of materials and increasing space utilization. Furthermore, this structure of the present invention can accommodate the recent trend towards thinness of the brushless vibration motor.

In addition, the volume of a magnet can be increased compared to that of the conventional technique by virtue of an increase of the spatial utilization because of removal of the casing. Hence, the efficiency of the magnetic circuit for causing rotation of a rotor is enhanced, thus improving the vibration characteristics of the vibration motor. As well, because sufficient weight and eccentric distance of a weight are ensured, the vibration performance of the vibration motor can be improved.

Moreover, the present invention is designed such that a stopper is prevented from being brought into contact with a bearing, thus preventing the problems of deterioration of vibration force or durability of the vibrator motor attributable to contact being made between the stopper and the bearing.

Although the embodiment of the present invention has been disclosed for illustrative purposes, it will be appreciated that the linear vibrator of the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A brushless vibration motor, comprising:
   a shaft;
   a bracket for lower case combined with a lower end of the shaft;
   a stator comprising at least one coil provided on an upper surface of the bracket;
   a bearing rotatably fitted over a circumferential outer surface of the shaft;
   a rotor for upper case exposed to the outside of the brushless vibration motor having a rotor yoke fitted over a circumferential outer surface of the bearing, a magnet coupled to the rotor yoke, and a weight causing eccentric rotation; and
   a stopper provided on an upper end of the shaft, the stopper for preventing the rotor from being lifted up and being spaced apart from an upper end of the bearing by a predetermined distance.

2. The brushless vibration motor as set forth in claim 1, further comprising:
   a washer provided on an upper end of the bracket and fitted over the circumferential outer surface of the shaft to support a lower end of the bearing.

3. The brushless vibration motor as set forth in claim 1, further comprising:
   detent torque generating means provided in the coil.

4. The brushless vibration motor as set forth in claim 1, wherein the rotor yoke comprises: a rim part fitted over the circumferential outer surface of the bearing; and a horizontal disk part bent from an upper end of the rim part and extending outwards.

5. The brushless vibration motor as set forth in claim 4, wherein the magnet and the weight are coupled to a lower surface of the horizontal disk part of the rotor yoke.

6. The brushless vibration motor as set forth in claim 1, wherein the stopper has a disk shape having an outer diameter less than an outer diameter of the bearing; and,
   the rotor yoke having a rim part fitted over the circumferential outer surface of the bearing and the stopper disposed in the rim part of the rotor yoke.

7. The brushless vibration motor as set forth in claim 1, wherein the stopper is coupled to the upper end of the shaft by welding.

8. The brushless vibration motor as set forth in claim 1, wherein the stopper is screwed over a second end of the shaft.

9. The brushless vibration motor as set forth in claim 1, wherein the stopper is coupled to the upper end of the shaft by caulking.

10. The brushless vibration motor as set forth in claim 1, wherein an upper surface of the stopper and an upper surface of the rotor yoke are disposed along a same line.

* * * * *